(12) United States Patent
Sakai et al.

(10) Patent No.: US 11,122,187 B2
(45) Date of Patent: Sep. 14, 2021

(54) TRANSMITTER, RECEIVER, TRANSMITTER/RECEIVER, AND TRANSMITTING/RECEIVING SYSTEM

(71) Applicant: THINE ELECTRONICS, INC., Tokyo (JP)

(72) Inventors: Tomohiro Sakai, Tokyo (JP); Kazuhisa Sasaki, Tokyo (JP); Satoshi Miura, Tokyo (JP); Daisuke Iwama, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/829,491

(22) Filed: Mar. 25, 2020

(65) Prior Publication Data
US 2020/0314293 A1 Oct. 1, 2020

(30) Foreign Application Priority Data

Mar. 28, 2019 (JP) .............................. JP2019-062762

(51) Int. Cl.
*G06F 3/14* (2006.01)
*H04N 5/14* (2006.01)
(Continued)

(52) U.S. Cl.
CPC ................. *H04N 5/14* (2013.01); *G06F 3/14* (2013.01); *H04N 21/4122* (2013.01); *H04N 21/4347* (2013.01); *G09G 2370/12* (2013.01)

(58) Field of Classification Search
CPC ..... G06F 3/14; G06F 1/12; G06F 5/06; G06F 13/1689; G06F 13/385; H04N 21/4122;
(Continued)

(56) References Cited

U.S. PATENT DOCUMENTS 7,068,650 B1 * 6/2006 Bachar .................... H04L 12/66
370/380
7,388,416 B2 6/2008 Marutani
(Continued)

FOREIGN PATENT DOCUMENTS

JP 2013-138426 A 7/2013

OTHER PUBLICATIONS

THine Electronics, Inc., "V-by-One® HS Standard Version 1.52", [online],[researched on the Internet on Mar. 22, 2019], Internethttps:// www.thine.co.jp/files/user/img/corporate/VBOSTD-V1P52-0000_ Abridged%2BEdition.pdf, Sep. 2018, pp. 1-7, 36-57 (total 29 pages).

*Primary Examiner* — Raymond N Phan
(74) *Attorney, Agent, or Firm* — Sughrue Mion, PLLC

(57) ABSTRACT

This embodiment relates to a transmitter and the like that prevent an increase of the number of cables of an external interface even when the types of signals to be transmitted increase. The transmitter includes a latch circuit, an encoder, a serializer, and a selector. The latch circuit keeps a level of each of a plurality of signals at the timing specified by a sampling clock, and then, outputs the plurality of signals as a parallel data signal. The encoder generates an encoded parallel data signal based on the parallel data signal from the latch circuit. The serializer generates a serial data signal based on the encoded parallel data signal from the encoder. The sampling clock has a frequency higher than a transmission rate of the fastest signal of the plurality of signals.

19 Claims, 4 Drawing Sheets

(51) Int. Cl.
*H04N 21/434* (2011.01)
*H04N 21/41* (2011.01)

(58) Field of Classification Search
CPC ......... H04N 21/4363; H04N 21/43635; H04N 21/4402
See application file for complete search history.

(56) References Cited

U.S. PATENT DOCUMENTS

| | | |
|---|---|---|
| 8,374,305 B2 | 2/2013 | Takada |
| 8,824,581 B2 | 9/2014 | Okada |
| 10,009,199 B2 | 6/2018 | Suzuki et al. |
| 10,241,283 B1* | 3/2019 | Shen .................... G02B 6/4246 |
| 2007/0279408 A1* | 12/2007 | Zheng ................ H04N 21/2365 |
| | | 345/213 |
| 2014/0173360 A1* | 6/2014 | Lee .................... H04L 25/0292 |
| | | 714/47.1 |
| 2015/0054723 A1* | 2/2015 | Li .......................... G09G 5/006 |
| | | 345/87 |
| 2015/0200766 A1* | 7/2015 | Zhang .................. H04L 7/0033 |
| | | 375/355 |
| 2016/0034409 A1* | 2/2016 | Kim ..................... G06F 13/409 |
| | | 710/110 |
| 2018/0241161 A1* | 8/2018 | Hsu ................... H01B 11/1813 |
| 2020/0365096 A1* | 11/2020 | Xiao ................... G09G 3/3666 |

* cited by examiner

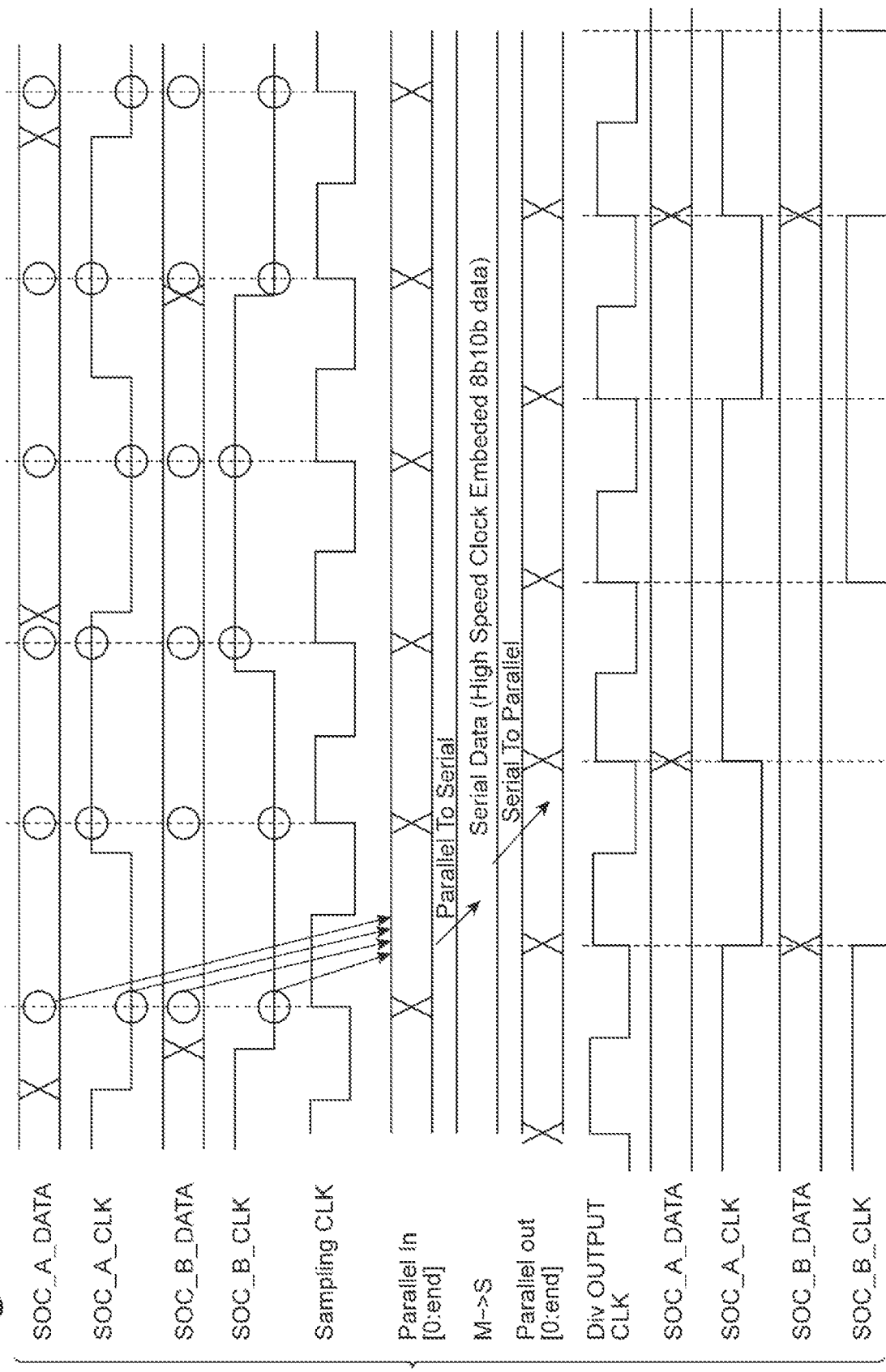

TRANSMITTER, RECEIVER, TRANSMITTER/RECEIVER, AND TRANSMITTING/RECEIVING SYSTEM

TECHNICAL FIELD

The present invention relates to a transmitter, a receiver, a transmitter/receiver, and a transmitting/receiving system.

BACKGROUND

Recent development of electronic device applications has diversified signals transmitted and received between electronic devices. Transmitting and receiving a plurality of diverse signal groups between electronic devices increases the number of wires such as metals, or transmission media of the plurality of signal groups, which leads to restriction of applications. Examples of the applications include video devices such as separate display systems.

Built-in display systems in the related art have a limit in accommodating needs for larger, thinner, and lighter displays and also have restrictions of arrangement and utility form. On the other hand, separate display systems, as disclosed in Patent Document 1 (Japanese Unexamined Patent Publication No. 2013-138426), have been proposed as systems that solve the limit and restrictions in the built-in display systems.

In separate display systems, video signals and the like are transmitted and received between two separate bodies.—An example of a large-size separate display system includes a wall-mounted TV display system, and an example of a small-size separate display system includes a head-mounted display system. Examples of the bodies include displays (such as liquid crystal panels), TV tuners, DVD recorders, and video game machines.

Hereinafter described is an exemplary separate display system in which a TV tuner and a display are placed separately. Video signals, audio signals, and various control signals are transmitted from the TV tuner to the display via an external interface. Based on the transmitted signals, the display shows images, outputs audios, or performs various controls. Control signals may be transmitted from the display to the TV tuner via the external interface.

As an external interface for transmitting video signals, High-Definition Multimedia Interface (HDMI, registered trademark) is known. HDMI has been applied to an external interface of a separate display system. The use of HDMI 2.0 to an external interface of a 4K separate display system makes it possible to transmit video signals with a single cable. A single HDMI 2.0 cable (for example, a type-A connector) has a total of 19 signal lines (wires), including eight video signal lines, five control signal lines, and others such as a power line.

The use of HDMI 2.0 to an external interface of an 8K separate display system requires four cables for transmitting video signals and the like since an amount of video transmission is four times that of 4K.

When HDMI 2.1 is applied to an external interface of an 8K separate display system, signals with a bandwidth of 48 Gbps are compressed so that 8K video signals are transmitted with a single cable that employs a known connector. In other words, it is possible to enable an 8K separate display system with a single cable.

Furthermore, it is possible to enable an external interface of a 4K or 8K separate display system when video signals are transmitted by V-by-One (registered trademark) recited in Non-Patent Document 1 ("V-by-One® HS Standard Version 1.52", [online], September 2018, TH-fine Electronics Inc., [researched on the Internet on Mar. 22, 2019], Internet <https://www.thine.co.jp/files/user/img/corporate/VBOSTD-V1P52-0000_Abridged %2BEdition.pdf>), when audio signals are transmitted by I2S (Inter-IC Sound), and when control signals are transmitted by I2C (Inter-Integrated Circuit). Note that V-by-One (registered trademark) is a de facto standard as an internal interface for transmitting video signals in displays such as liquid crystal panels.

SUMMARY

As a result of studying techniques in the related art, the inventors have found the following problems. That is, the use of HDMI 2.1 to an external interface of an 8K separate display system requires sufficient time for each process of signal compression and decompression, which causes a delay in video display. In addition, irreversibility of the compression technique deteriorates a video on a display. Furthermore, the use of HDMI 2.0 to an external interface of an 8K separate display system increases the number of cables.

On the other hand, when V-by-One (registered trademark) is used as an external interface of an 8K separate display system to transmit video signals, it is possible to prevent an increase of the number of cables and to transmit video signals without compression. However, audio signals and control signals are more diverse than video signals. Accordingly, when signal lines (wires) are allocated to each of these diverse signal groups, the number of signal lines increases, leading to an increase in thickness of a cable.

The present invention has been made to solve the problems, and an object of the present invention is to provide a transmitter and a receiver that prevent an increase of the number of cables of an external interface even when the types of signals to be transmitted increase. Another object of the present invention is to provide a transmitter/receiver including the transmitter and the receiver, and a transmitting/receiving system that transmits and receives a signal between the transmitter and the receiver.

The transmitter according to this embodiment transmits to a receiver a serial data signal based on a plurality of signals including at least two types of signal groups having different transmission rates. The receiver according to this embodiment receives from a transmitter a serial data signal based on a plurality of signals including at least two types of signal groups having different transmission rates. The transmitter/receiver according to this embodiment includes the transmitter according to this embodiment and the receiver according to this embodiment that receives a serial data signal transmitted from another transmitter other than the transmitter. The transmitting/receiving system according to this embodiment includes the transmitter according to this embodiment and the receiver according to this embodiment that receives the serial data signal transmitted from the transmitter. As an example, in the transmitter according to this embodiment, a latch circuit keeps a level of each of the plurality of signals at the timing specified by a sampling clock, and then, outputs the plurality of signals as a parallel data signal. An encoder generates an encoded parallel data signal based on the parallel data signal from the latch circuit. A serializer generates a serial data signal based on the encoded parallel data signal from the encoder. A selector selects any of a training pattern signal and the serial data signal from the serializer as a signal to be transmitted to the receiver.

BRIEF DESCRIPTION OF THE DRAWINGS

FIG. 4 is a timing chart illustrating an example of behavior of the transmitting/receiving system.

DETAILED DESCRIPTION

Embodiment of the Present Invention

Figure 1:
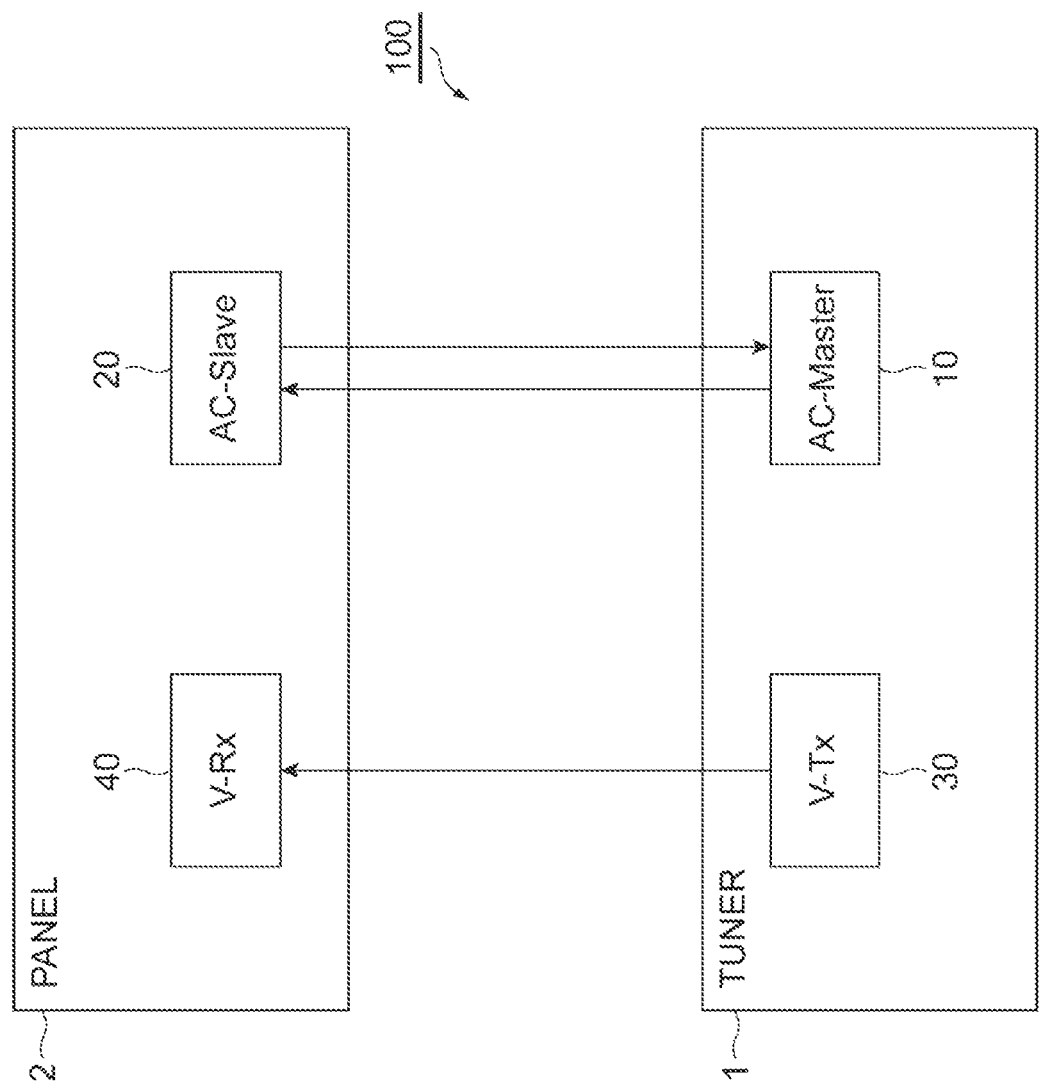
FIG. 1 is a view illustrating a configuration example of a transmitting/receiving system.

First, the contents of embodiments of the present invention will be recited and described individually.

(1) A transmitter according to this embodiment is a device that transmits to a receiver a serial data signal based on a plurality of signals including at least two types of signal groups having different transmission rates. One aspect of the transmitter includes a latch circuit, an encoder, a serializer, and a selector. The "plurality of signals" may include different types of signals having the same transmission rate. The latch circuit includes a first input terminal that inputs a plurality of signals, a second input terminal that inputs a sampling clock faster than a transmission rate of the fastest signal of the plurality of signals, and an output terminal that outputs a parallel data signal. The latch circuit keeps a level of each of the plurality of signals at the timing specified by the sampling clock, and then, outputs the plurality of signals as a parallel data signal. The encoder includes an input terminal electrically connected to the output terminal of the latch circuit and an output terminal that outputs an encoded parallel data signal. The encoder generates the encoded parallel data signal based on the parallel data signal from the latch circuit. The serializer includes an input terminal electrically connected to the output terminal of the encoder and an output terminal that outputs the serial data signal. The serializer generates the serial data signal based on the encoded parallel data signal from the encoder. The selector includes a first input terminal electrically connected to the output terminal of the serializer, a second input terminal that inputs a training pattern signal for training clock data recovery in the receiver, and an output terminal that outputs a signal to be transmitted to a receiver. The selector selects any of the training pattern signal and the serial data signal from the serializer as the signal to be transmitted to the receiver.

(2) The receiver according to this embodiment is a receiver that receives from a transmitter a serial data signal based on a plurality of signals including at least two types of signal groups having different transmission rates. One aspect of the receiver includes a receiving unit, a frequency divider, a deserializer, a decoder, and a latch circuit. The receiving unit includes an input terminal that inputs a training pattern signal and the serial data signal transmitted from the transmitter, a first output terminal that outputs a recovered clock, and a second output terminal that outputs recovered data. The receiving unit performs training of clock data recovery based on the training pattern signal and recovers the clock and data based on the serial data signal transmitted from the transmitter after the training is completed. The frequency divider includes an input terminal electrically connected to the first output terminal of the receiving unit and an output terminal that outputs a sampling clock faster than a transmission rate of the fastest signal of the plurality of signals. The frequency divider divides a frequency of the recovered clock from the receiving unit so as to generate the sampling clock. The deserializer includes an input terminal electrically connected to the second output terminal of the receiving unit and an output terminal that outputs a parallel data signal. The deserializer generates the parallel data signal based on the recovered data from the receiving unit. The decoder includes an input terminal electrically connected to the output terminal of the deserializer and an output terminal that outputs a decoded parallel data signal. The decoder generates the decoded parallel data signal based on the parallel data signal from the deserializer. The latch circuit includes an input terminal electrically connected to the output terminal of the decoder and an output terminal that outputs any of the plurality of signals. After keeping a level of each bit of the decoded parallel data signal from the decoder at the timing indicated by the sampling clock, the latch circuit outputs a signal of each bit as any of the plurality of signals.

(3) The transmitter/receiver according to this embodiment, as one aspect, includes a transmitter having the aforementioned structure (the transmitter according to this embodiment) and a receiver having the aforementioned structure (the receiver according to this embodiment) that receives a serial data signal transmitted from another transmitter other than the transmitter. In the transmitter/receiver, the transmitter and the receiver are preferably disposed in an integrated manner. The transmitter and the receiver may be formed on a common semiconductor substrate or may be formed on separate semiconductor substrates and put in a common package. Alternatively, the transmitter and the receiver may be put in separate packages and put in a common body.

(4) The transmitting/receiving system according to this embodiment, as one aspect, includes a transmitter having the aforementioned structure (the transmitter according to this embodiment) and a receiver having the aforementioned structure (the receiver according to this embodiment) that receives the serial data signal transmitted from the transmitter. Furthermore, it is preferable that the transmitting/receiving system according this embodiment should further include a video transmitter configured to transmit a video signal and a video receiver configured to receive a video signal transmitted from the video transmitter.

(5) As one aspect applicable to the transmitter, the receiver, the transmitter/receiver, and the transmitting/receiving system described above, the sampling clock may be faster than the transmission rate of the fastest signal of the plurality of signals and may be asynchronous with the fastest signal. Any of the plurality of signals may be an audio signal. In such a case, the sampling clock preferably has a frequency equivalent to a transmission rate of the audio signal or a multiplied frequency. Any of the plurality of signals may be a clock embedded data signal.

As described above, each aspect recited in [Embodiment of the Present Invention] is applicable to the other aspects or to any combination of these aspects.

Details of Embodiment of the Present Invention

Hereinafter, specific structures of the transmitter, the receiver, the transmitter/receiver, and the transmitting/receiving system according to this embodiment will be described in detail with reference to the accompanying drawings. Note that the present invention is not limited to the following examples and is represented by the claims. The present invention includes any modification equivalent to the claims or within the scope of the claims. In description of the drawings, note that the same elements will be denoted with the same reference numerals and redundant description will be omitted.

FIG. 1 is a view illustrating a configuration example of a transmitting/receiving system 100. The transmitting/receiving system 100 will hereinafter be described as a separate display system in which a TV tuner 1 and a display 2 are placed separately. The TV tuner 1 includes a transmitter/receiver 10 and a video transmitter 30. The display 2 includes a transmitter/receiver 20 and a video receiver 40. Signals to be transmitted from the TV tuner 1 to the display 2 are video signals, audio signals, and control signals. Signals to be transmitted from the display 2 to the TV tuner 1 are control signals. In this embodiment, the control signals includes various kinds of signals (for example, remote control operating information) excluding video signals and audio signals.

Video signals are transmitted from the video transmitter 30 of the TV tuner 1 to the video receiver 40 of the display 2. The signals may be transmitted in a single direction from the video transmitter 30 to the video receiver 40. Such a one-way interface of video signals by the video transmitter 30 and the video receiver 40 is a de facto standard known as V-by-One (registered trademark).

In the related art, audio signals are transmitted from a TV tuner to a display by, for example, communication according to I2S standard. I2S standard is typically used for transmitting audio signals. When transmitting two-channel stereo audio signals according to I2S standard, it is necessary to transmit channel information, digitized audio data, and a clock synchronized with the audio data, which requires three or four signal lines.

In the related art, control signals are transmitted from a TV tuner to a display by, for example, communication according to I2C standard. In some cases, control signals are transmitted from a display to a TV tuner. I2C standard is typically used for transmitting control signals. I2C standard allows bidirectional communication of low-rate signals of several hundred KHz and is suitable for transmission of control signals that does not require many bands. Transmission of signals according to I2C standard requires two signal lines.

Transmitting video signals by V-by-One (registered trademark), transmitting audio signals by I2S, and transmitting control signals bidirectionally by I2C enables an external interface of a separate display system.

When V-by-One (registered trademark), or a video signal transmission technology, is applied to an external interface of an 8K separate display system, it is possible to prevent an increase of the number of cables and to transmit video signals without compression.

On the other hand, audio signals and control signals are more diverse than video signals. Accordingly, when signal lines (wires) are allocated to each of these diverse signals, the number of signal lines increases, causing an increase in thickness of a cable. Furthermore, these signals do not always have the same transmission rate and are not always synchronized. Accordingly, these signals cannot be transmitted by a simple serialization technology which is used for video signals. For example, audio signals are transmitted at about Mbps, but control signals are often transmitted at about Kbps.

Therefore, the transmitting/receiving system 100 of this embodiment employs the transmitter/receiver 10 and the transmitter/receiver 20 to transmit audio signals and control signals between the TV tuner 1 and the display 2. The transmitting/receiving system 100 according to this embodiment does not necessarily perform communication according to I2S and I2C.

Figure 2:
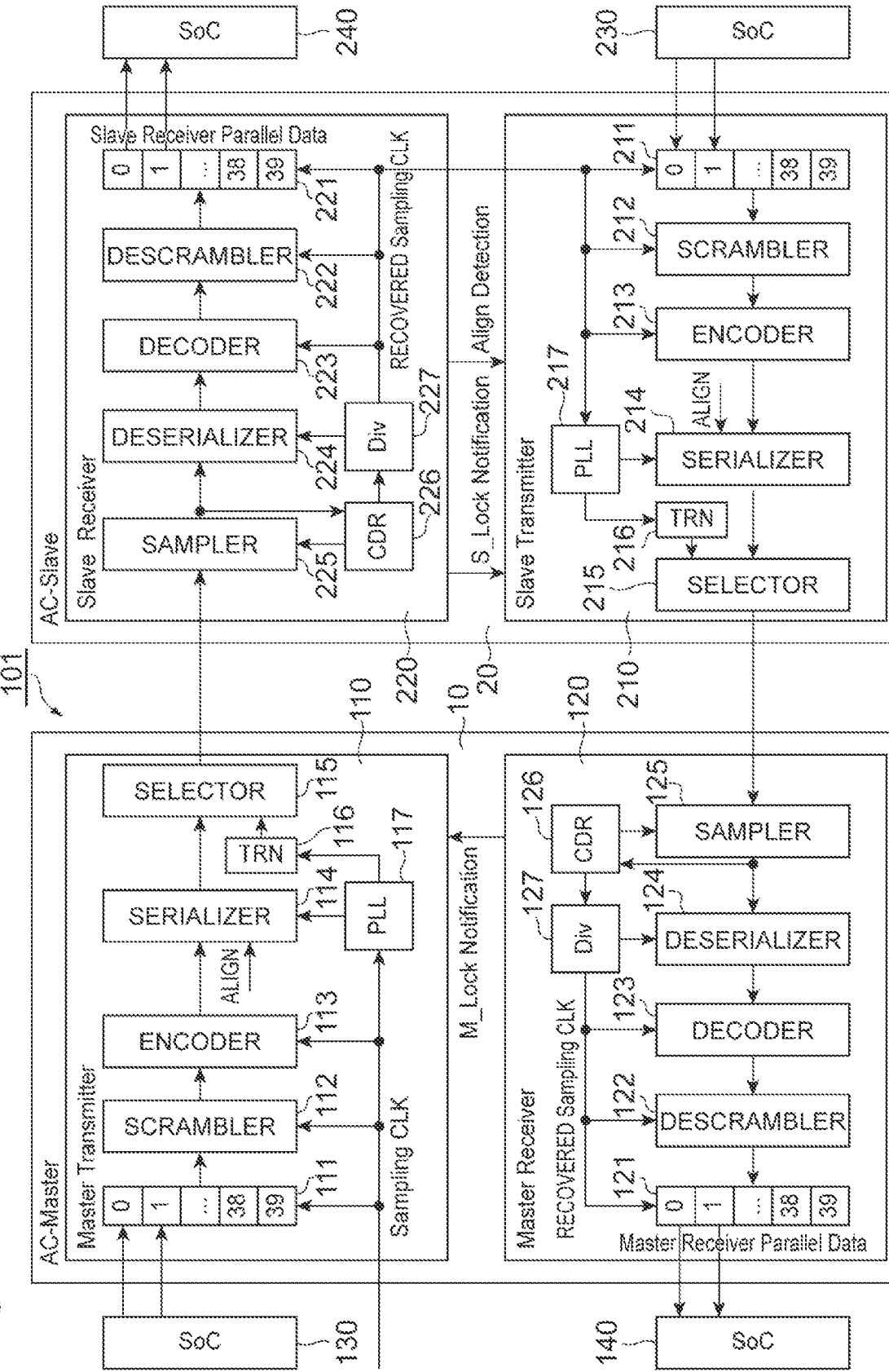
FIG. 2 is a view illustrating a configuration example of a transmitting/receiving system.

FIG. 2 is a view illustrating a configuration example of a transmitting/receiving system 101. The transmitting/receiving system 101 illustrated in FIG. 2 will hereinafter be described as a device provided with the transmitter/receiver 10 and the transmitter/receiver 20 of the transmitting/receiving system 100 (separate display system) illustrated in FIG. 1. Note that circuit elements recited in, for example, U.S. Pat. Nos. 8,374,305 B2, 10,009,199 B2, 8,824,581 B2, 7,388,416 B2, and the like are applicable to the following phase-locked loop circuit (PLL circuit), frequency divider, sampler, clock data recovery (CDR) unit, scrambler, selector, encoder, serializer, descrambler, decoder, deserializer, and latch circuit. These documents such as U.S. Pat. Nos. 8,374,305 B2, 10,009,199 B2, 8,824,581 B2, 7,388,416 B2, and the like are incorporated herein by reference in their entirety.

The transmitter/receiver 10 includes a transmitter 110 and a receiver 120. The transmitter 110 and the receiver 120 are disposed in a TV tuner 1 in an integrated manner. The transmitter 110 and the receiver 120 may be formed on a common semiconductor substrate or may be formed on separate semiconductor substrates and put in a common package. Alternatively, the transmitter 110 and the receiver 120 may be put in separate packages and put in a common body.

The transmitter 110 includes a latch circuit (for example, an n-bit latch circuit including n (≥1) number of latch circuits) 111, a scrambler 112, an encoder 113, a serializer 114, a selector 115, a training pattern signal generator 116, and a PLL circuit 117. The latch circuit 111 includes a first input terminal that inputs a plurality of signals, a second input terminal that inputs a sampling clock faster than a transmission rate of the fastest signal of the plurality of signals, and an output terminal that outputs a parallel data signal. The encoder 113 includes an input terminal electrically connected to the output terminal of the latch circuit 111 via the scrambler 112 and includes an output terminal that outputs an encoded parallel data signal. The serializer 114 includes an input terminal electrically connected to the output terminal of the encoder 113 and an output terminal that outputs a serial data signal. The selector 115 includes a first input terminal electrically connected to the output terminal of the serializer 114, a second input terminal that inputs a training pattern signal for training clock data recovery in a receiver 220 of the transmitter/receiver 20, and an output terminal that outputs a signal to be transmitted to the receiver 220.

The receiver 120 includes a latch circuit 121, a descrambler 122, a decoder 123, a deserializer 124, a sampler 125, a CDR unit 126, and a frequency divider 127. The CDR unit (receiving unit) 126 includes an input terminal that inputs a training pattern signal and a serial data signal transmitted from a transmitter 210 via the sampler 125, a first output terminal that outputs a recovered clock to the sampler 125, and a second output terminal that outputs recovered data. The frequency divider 127 includes an input terminal electrically connected to the first output terminal of the CDR unit 126, and an output terminal that outputs the sampling clock faster than the transmission rate of the fastest signal of the plurality of signals. The deserializer 124 includes an input terminal electrically connected to the second output terminal of the CDR unit 126 via the sampler 125 and includes an output terminal that outputs a parallel data signal. The decoder 123 includes an input terminal electrically connected to the output terminal of the deserializer 124 and an output terminal that outputs a decoded parallel data signal. The latch circuit 121 includes an input terminal electrically connected to the output terminal of the decoder 123 via the descrambler 122 and includes an output terminal that outputs any of the plurality of signals.

The transmitter/receiver 20 includes the transmitter 210 and the receiver 220. The transmitter 210 and the receiver 220 are disposed in a display 2 in an integrated manner. The transmitter 210 and the receiver 220 may be formed on a common semiconductor substrate or may be formed on separate semiconductor substrates and put in a common package. Alternatively, the transmitter 210 and the receiver 220 may be put in separate packages and put in a common body.

The transmitter 210 includes a latch circuit 211, a scrambler 212, an encoder 213, a serializer 214, a selector 215, a training pattern signal generator 216, and a PLL circuit 217. The latch circuit 211 includes a first input terminal that inputs the plurality of signals, a second input terminal that inputs the sampling clock faster than the transmission rate of the fastest signal of the plurality of signals, and an output terminal that outputs a parallel data signal. The encoder 213 includes an input terminal electrically connected to the output terminal of the latch circuit 211 via the scrambler 212 and includes an output terminal that outputs an encoded parallel data signal. The serializer 214 includes an input terminal electrically connected to the output terminal of the encoder 213 and an output terminal that outputs a serial data signal. The selector 215 includes a first input terminal electrically connected to the output terminal of the serializer 214, a second input terminal that inputs a training pattern signal for training clock data recovery in the receiver, and an output terminal that outputs a signal to be transmitted to the receiver 120 of the transmitter/receiver 10.

The receiver 220 includes a latch circuit 221, a descrambler 222, a decoder 223, a deserializer 224, a sampler 225, a CDR unit 226, and a frequency divider 227. The CDR unit (receiving unit) 226 includes an input terminal that inputs the training pattern signal and the serial data signal transmitted from the transmitter 110 via the sampler 225, a first output terminal that outputs a recovered clock to the sampler 225, and a second output terminal that outputs recovered data. The frequency divider 227 includes an input terminal electrically connected to the first output terminal of the CDR unit 226 and an output terminal that outputs the sampling clock faster than the transmission rate of the fastest signal of the plurality of signals. The deserializer 224 includes an input terminal electrically connected to the second output terminal of the CDR unit 226 via the sampler 225 and includes an output terminal that outputs a parallel data signal. The decoder 223 includes an input terminal electrically connected to the output terminal of the deserializer 224 and an output terminal that outputs a decoded parallel data signal. The latch circuit 221 includes an input terminal electrically connected to the output terminal of the decoder 223 via the descrambler 222 and includes an output terminal that outputs any of the plurality of signals.

A serial data signal based on the plurality of signals including at least two signals having different transmission rates is transmitted from the transmitter 110 to the receiver 220. A serial data signal based on the plurality of signals including at least two signals having different transmission rates is transmitted from the transmitter 210 to the receiver 120.

Audio signals and control signals are transmitted from the transmitter 110 of the TV tuner 1 to the receiver 220 of the display 2. Control signals are transmitted from the transmitter 210 of the display 2 to the receiver 120 of the TV tuner 1. Furthermore, the transmitting/receiving system 101 operates using the transmitter/receiver 10 of the TV tuner 1 as a master and the transmitter/receiver 20 of the display 2 as a slave.

In the transmitter 110 and the transmitter 210, the same components have the same configuration and function. In the receiver 120 and the receiver 220, the same components have the same configuration and function. Hereinafter, mainly the transmitter 110 and the receiver 220 will be described in detail.

The latch circuit 111 of the transmitter 110 inputs a plurality of signals outputted from a SoC 130 and also inputs a sampling clock. The latch circuit 111 keeps a level of each of the plurality of signals at the timing specified by the sampling clock, and then, outputs the plurality of signals as a parallel data signal. The sampling clock in the master transmitter/receiver will hereinafter be referred to as a master sampling clock.

A system-on-a-chip (SoC) is an integrated circuit designed on a single semiconductor chip, having functions of a general purpose microcontroller such as a processor core as well as application purpose functions. In this embodiment, the SoC 130 is responsible for transmitting video signals and audio signals and for transmitting/receiving control signals.

The scrambler 112 and the encoder 113 generate and output the encoded parallel data signal based on the parallel data signal outputted from the latch circuit 111. The scrambler 112 scrambles the parallel data signal outputted from the latch circuit 11 using a random number generated by a random number generator. The encoder 113 performs, for example, 8B10B encoding based on the parallel data signal scrambled by the scrambler 112 and outputs the encoded parallel data signal.

The serializer 114 generates and outputs the serial data signal based on the parallel data signal outputted from the encoder 113. Furthermore, the serializer 114 inserts an alignment code into the serial data signal. In other words, the serial data signal includes the alignment code in addition to audio signals and control signals. The alignment code is used for bit alignment when a serial data signal is converted into a parallel data signal in the receiver 220. For example, when the encoder 113 performs 8B10B encoding, D codes are used for audio signals and control signals, and K codes are used for alignment codes. Although there are 80 K codes, using one specific code or a small number of K codes among the 80 codes as an alignment code will do and facilitates detection of an alignment code (detection of a K code) in the receiver 220.

The selector 115 selects one of the training pattern signal outputted from the training pattern signal generator 116 and the serial data signal outputted from the serializer 114, and sends the selected signal to the receiver 220. The phase lock loop (PLL) circuit 117 generates a clock having a frequency that is a multiple of the frequency of the master sampling clock. The training pattern signal generator 116 generates the training pattern signal based on the clock generated by the PLL circuit 117. The training pattern signal is used during the training of the clock data recovery in the receiver 220 and is preferably a clock signal with a constant frequency having a duty ratio of 0.5.

The sampler 225 and the CDR unit 226 of the receiver 220 are receiving units that receive the signal transmitted from the transmitter 110, being configured to perform training of the clock data recovery based on the training pattern signal, and to recover and transmit the clock and data based on the transmitted serial data signal after the training is completed. The sampler 225 samples the signal transmitted from the transmitter 110 at the timing indicated by the clock outputted from the CDR unit 226, and outputs the sampled data. The CDR unit 226 generates a clock to be supplied to the sampler 225 so that a frequency and phase of data outputted from the sampler 225 are coincident (locked) with those of the signal transmitted from the transmitter 110. In a synchronized state, the sampler 225 outputs the recovered data, and the CDR unit 226 outputs the recovered clock. The training pattern signal is used when training the clock data recovery.

The frequency divider 227 divides a frequency of the recovered clock outputted from the CDR unit 226 so as to generate and output a sampling clock. The deserializer 224 generates and outputs the parallel data signal based on the recovered data outputted from the sampler 225. Hereinafter, the sampling clock in the slave transmitter/receiver will hereinafter be referred to as a slave sampling clock.

The decoder 223 and the descrambler 222 generate and output the decoded parallel data signal based on the parallel data signal outputted from the deserializer 224. With respect to the parallel data signal outputted from the deserializer 224, the decoder 223 performs a decoding process corresponding to the encoding process performed by encoder 113 and outputs the decoded parallel data signal. The descrambler 222 includes a random number generator similar to the random number generator included in the scrambler 112. Using a random number generated by the random number generator, the descrambler 222 descrambles the parallel data signal outputted from the decoder 223.

The latch circuit 221 keeps a level of each bit of the parallel data signal outputted from the descrambler 222 at the timing indicated by the slave sampling clock outputted from the frequency divider 227, and then, outputs a signal of each bit as any of the plurality of signals. At this time, the latch circuit 221 performs bit position alignment of the parallel data signal based on the alignment code included in the serial data signal transmitted from the transmitter 110.

An SoC 240 inputs a parallel data signal held and output by the latch circuit 221 in association with any of the plurality of signals, and performs necessary processing (for example, video output, audio output, and various controls).

The plurality of signals transmitted as the serial data signal from the transmitter 110 to the receiver 220 (the plurality of signals inputted to the latch circuit 111 of the transmitter 110 and the plurality of signals outputted from the latch circuit 221 of the receiver 220) do not necessarily have the same transmission rate and are not necessarily synchronized. One of the plurality of signals may be a clock signal synchronized with another signal.

The master sampling clock inputted to the latch circuit 111 of the transmitter 110 and the slave sampling clock generated by the frequency divider 227 of the receiver 220 has a frequency faster than the transmission rate of the fastest signal of the plurality of signals transmitted as the serial data signal from the transmitter 110 to the receiver 220.

The master sampling clock and the slave sampling clock may have the same frequency as the transmission rate of the fastest signal of the plurality of signals. In this case, it is possible to enable serial-parallel conversion by the deserializer 224 of the receiver 220 with a simple configuration.

The master sampling clock and the slave sampling clock may be faster than the transmission rate of the fastest signal of the plurality of signals and may be asynchronous with the fastest signal. In this case, even when those sampling clocks are required to be asynchronous due to system restrictions or application demands, it is possible to configure the serializer 114 and the deserializer 224 easily.

Any of the plurality of signals may be a clock embedded data signal. Signals to be transmitted are not always separated into data and a clock. Accordingly, transmitting a clock embedded data signal enables a transmittable versatile signal format.

Any of the plurality of signals may be an audio signal. In such a case, the master sampling clock and the slave sampling clock preferably have a frequency equivalent to a transmission rate of the audio signal or a multiplied frequency. In this case, it is possible to match a clock for generating an audio signal from an audio by AD conversion on a transmitter and a clock for generating an audio from an audio signal by DA conversion in a receiver. Accordingly, it is possible to prevent deterioration of the audio generated in the receiver.

Figure 3:
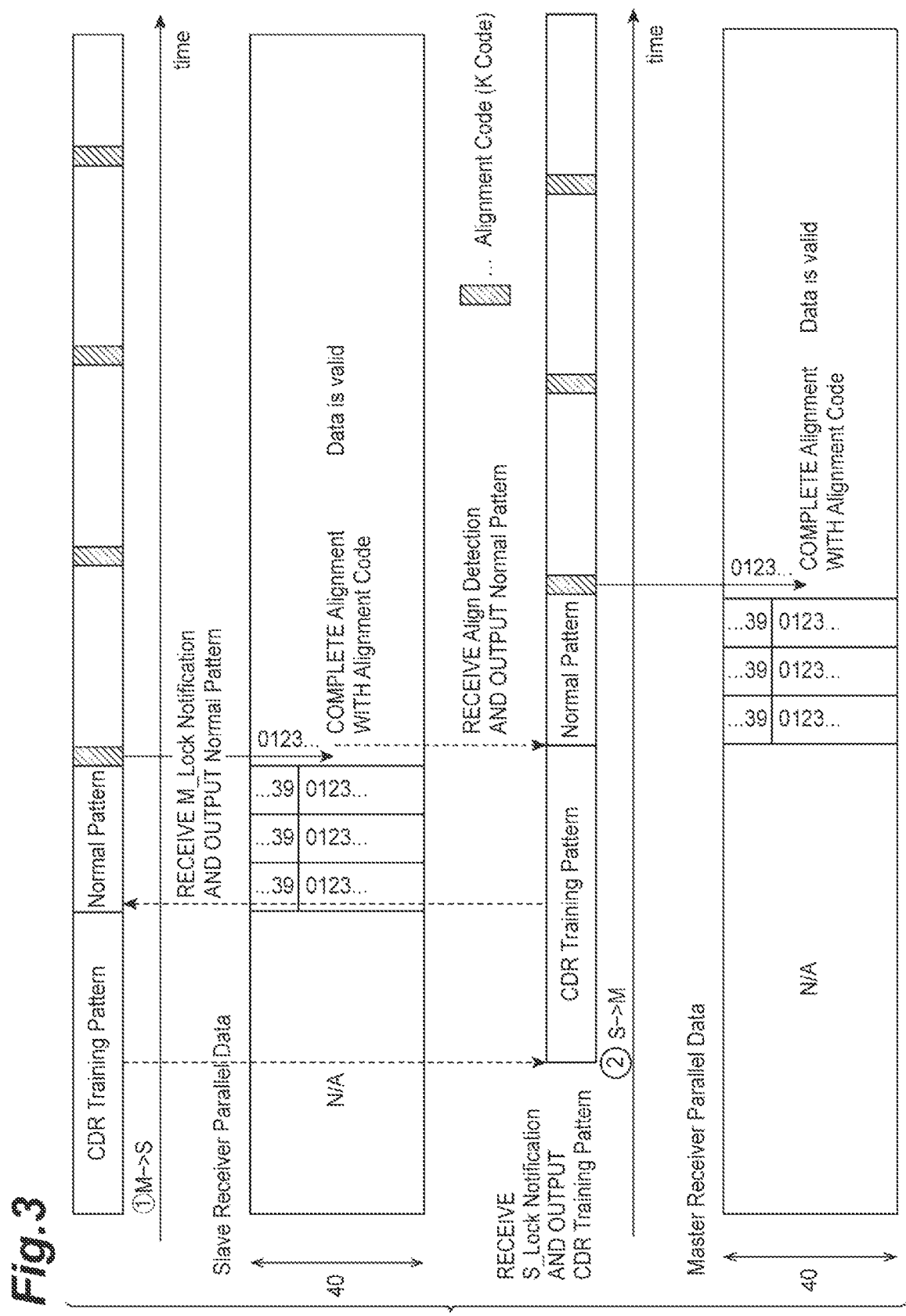
FIG. 3 is a view illustrating an example of behavior of the transmitting/receiving system.

FIG. 3 is a view illustrating an example of behavior of the transmitting/receiving system 101. FIG. 3 illustrates, in the following order from the top, the clock training signal and the serial data signal transmitted from the transmitter 110 to the receiver 220, the parallel data signal generated in the receiver 220 that has received those signals, the clock training signal and the serial data signal transmitted from the transmitter 210 to the receiver 120, and the parallel data signal generated in the receiver 120 that has received those signals.

In the transmitter 110, the training pattern signal (CDR Training Pattern) outputted from the training pattern signal generator 116 is transmitted from the selector 115 to the receiver 220. In the receiver 220 that has received the training pattern signal, the sampler 225 and the CDR unit 226 perform clock training.

After the clock training, when it is determined that a frequency and phase of data outputted from the sampler 225 are coincident (locked) with those of the training pattern signal transmitted from the transmitter 110, the receiver 220 transmits a signal (S_Lock Notification) indicating the result to the transmitter 210. Furthermore, the slave sampling clock is generated by the frequency divider 227 based on the recovered clock outputted from the CDR unit 226 and is transmitted to the transmitter 210.

When the transmitter 210 receives the lock signal (S_Lock Notification) from the receiver 220, the training pattern signal (CDR Training Pattern) outputted from the training pattern signal generator 216 is transmitted from the selector 215 to the receiver 120. In the receiver 120 that has received the training pattern signal, the sampler 125 and the CDR unit 126 perform clock training.

After the clock training, when it is determined that a frequency and phase of data outputted from the sampler 125 are coincident (locked) with those of the training pattern signal transmitted from the transmitter 210, the receiver 120 transmits a signal (M_Lock Notification) indicating the result to the transmitter 110. Furthermore, the slave sampling clock is generated by the frequency divider 227 based on the recovered clock outputted from the CDR unit 126.

When the transmitter 110 receives the lock signal (M_Lock Notification) from the receiver 120, the serial data signal (Normal Pattern) outputted from the serializer 114 is transmitted from the selector 115 to the receiver 220. The serial data signal herein is generated by parallel-serial conversion by the serializer 114 after being outputted from the SoC 130 and passing through the latch circuit 111, the scrambler 112, and the encoder 113. Furthermore, an alignment code (Alignment Code) is inserted in this serial data signal.

In the receiver 220, the sampler 225 and the CDR unit 228 recover the data and clock based on the serial data signal transmitted from the transmitter 110. The deserializer 224 converts the recovered data into a parallel data signal. After passing through the decoder 223 and the descrambler 222, the parallel data signal is held by the latch circuit 221 at the timing indicated by the slave sampling clock outputted from the frequency divider 227. Then, the bits of the parallel data signal are aligned based on the alignment code. When the bit alignment of the parallel data signal is completed, a signal (Align Detection) indicating the completion is transmitted from the receiver 220 to the transmitter 210. Then, the parallel data signal held and output by the latch circuit 221 is outputted to the SoC 240 in association with any of the plurality of signals.

When the transmitter 210 receives the alignment completion signal (Align Detection) from the receiver 220, the serial data signal (Normal Pattern) outputted from the serializer 214 is transmitted from the selector 215 to the receiver 120. The serial data signal herein is generated by parallel-serial conversion by the serializer 214 after being outputted from the SoC 230 and passing through the latch circuit 211, the scrambler 212, and the encoder 213. Furthermore, an alignment code (Alignment Code) is inserted in this serial data signal.

In the receiver 120, the sampler 125 and the CDR unit 128 recover the data and clock based on the serial data signal transmitted from the transmitter 210. The deserializer 124 converts the recovered data into a parallel data signal. After passing through the decoder 123 and the descrambler 122, the parallel data signal is held by the latch circuit 121 at the timing indicated by the master sampling clock outputted from the frequency divider 127. Then, the bits of the parallel data signal are aligned based on the alignment code. After the bit alignment of the parallel data signal is completed, the parallel data signal held and output by the latch circuit 121 is outputted to a SoC 140 in association with any of the plurality of signals.

FIG. 4 is a timing chart illustrating an example of behavior of the transmitting/receiving system. FIG. 4 illustrates, in the following order from the top, the signals (SoC_A_DATA, SoC_A_CLK, SoC_B_DATA, SoC_B_CLK) to be inputted from the SoC 130 to the latch circuit 111 of the transmitter 110, the master sampling clock (SamplingCLK) to be inputted to the transmitter 110, the parallel data signal (Parallel In) to be inputted to the serializer 114 of the transmitter 110, the serial data signal (M->S) to be transmitted from the transmitter 110 to the receiver 220, the parallel data signal (Parallel Out) to be outputted from the deserializer 224 of the receiver 220), the slave sampling clock (Div OutputCLK) to be outputted from the frequency divider 227 of the receiver 220, and the signals (SoC_A_DATA, SoC_A_CLK, SoC_B_DATA, SoC_B_CLK) to be outputted from the latch circuit 221 of the receiver 220 to the SoC 240. Herein, SoC_A_CLK is a synchronous clock of SoC_A_DATA, and SoC_B_CLK is a synchronous clock of SoC_B_DATA.

SoC_A_DATA, SoC_A_CLK, SoC_B_DATA, and SoC_B_CLK have different transmission rates and are asynchronous. Among these signals, the master sampling clock having a frequency higher than the transmission rate of the fastest signal is used, and the plurality of signals is held by the latch circuit 111 at the timing indicated by the master sampling clock. The serial data signal is generated by parallel-to-serial conversion, and then, transmitted from the transmitter to the receiver. Accordingly, it is possible to prevent an increase of the number of cables of an external interface even when the types of signals to be transmitted increase.

Control signals transmitted and received between SoCs include, for example, signals necessary for reproducing and outputting videos and audios, signals indicating states of a transmitter and a receiver, and signals indicating instructions given from a remote controller. In a head-mounted display system, examples of the control signals transmitted and received between SoCs include information associated with the position and orientation of a display (the head) and biosensor information of a person wearing the display.

The present invention is not limited to the above embodiment and may employ various modifications. The present invention is not limited to applications as separate display systems. In general, the present invention is suitably applied to a system in which a plurality of signals to be transmitted and received is asynchronous and has different transmission rates. Any types of the plurality of signals may be transmitted and received. The present invention is applicable to, for example, industrial robot systems or printing systems.

As described above, according to an embodiment of the present invention, it is possible to prevent an increase of the number of cables of an external interface even when the types of signals to be transmitted increase.

It is clear from the description that the present invention may employ various modifications. Such modifications are not allowed to depart from the spirit and scope of the invention, and modifications common among those skilled in the art are included in the scope of the following claims.

What is claimed is:

1. A transmitter that transmits to a receiver a serial data signal based on a plurality of signals including at least two types of signal groups having different transmission rates, the transmitter comprising:
    a latch circuit having a first input terminal that inputs the plurality of signals, a second input terminal that inputs a sampling clock faster than a transmission rate of the fastest signal of the plurality of signals, and an output terminal that outputs a parallel data signal, the latch circuit being configured to keep a level of each of the plurality of signals at a timing indicated by the sampling clock, and then, to output the plurality of signals as the parallel data signal;
    an encoder having an input terminal electrically connected to the output terminal of the latch circuit and an output terminal that outputs an encoded parallel data signal, the encoder being configured to generate the encoded parallel data signal based on the parallel data signal from the latch circuit;
    a serializer having an input terminal electrically connected to the output terminal of the encoder and an output terminal that outputs the serial data signal, the serializer being configured to generate the serial data signal based on the encoded parallel data signal from the encoder; and
    a selector having a first input terminal electrically connected to the output terminal of the serializer, a second input terminal that inputs a training pattern signal for training clock data recovery in the receiver, and an output terminal that outputs a signal to be transmitted to the receiver, the selector being configured to select any of the training pattern signal and the serial data signal from the serializer as the signal to be transmitted to the receiver.

2. The transmitter according to claim 1,
wherein the sampling clock is faster than the transmission rate of the fastest signal of the plurality of signals and asynchronous with the fastest signal.

3. The transmitter according to claim 1,
wherein any of the plurality of signals is an audio signal, and
the sampling clock has a frequency equivalent to a transmission rate of the audio signal or a multiplied frequency.

4. The transmitter according to claim 1,
wherein any of the plurality of signals is a clock embedded data signal.

5. A receiver that receives from a transmitter a serial data signal based on a plurality of signals including at least two types of signal groups having different transmission rates, the receiver comprising:
a receiving unit having an input terminal that inputs a training pattern signal and the serial data signal transmitted from the transmitter, a first output terminal that outputs a recovered clock, and a second output terminal that outputs recovered data, the receiving unit being configured to perform training of clock data recovery based on the training pattern signal and to recover the clock and data based on the serial data signal transmitted from the transmitter after the training is completed;
a frequency divider having an input terminal electrically connected to the first output terminal of the receiving unit and an output terminal that outputs a sampling clock faster than a transmission rate of the fastest signal of the plurality of signals, the frequency divider being configured to divide a frequency of the recovered clock from the receiving unit so as to generate the sampling clock;
a deserializer having an input terminal electrically connected to the second output terminal of the receiving unit and an output terminal that outputs a parallel data signal, the deserializer being configured to generate the parallel data signal based on the recovered data from the receiving unit;
a decoder having an input terminal electrically connected to the output terminal of the deserializer and an output terminal that outputs a decoded parallel data signal, the decoder being configured to generate the decoded parallel data signal based on the parallel data signal from the deserializer; and
a latch circuit having an input terminal electrically connected to the output terminal of the decoder and an output terminal that outputs any of the plurality of signals, the latch circuit being configured to keep a level of each bit of the decoded parallel data signal from the decoder at a timing indicated by the sampling clock, and then, to output a signal of each bit as any of the plurality of signals.

6. The receiver according to claim 5,
wherein the sampling clock is faster than the transmission rate of the fastest signal of the plurality of signals and asynchronous with the fastest signal.

7. The receiver according to claim 5,
wherein any of the plurality of signals is an audio signal, and
the sampling clock has a frequency equivalent to a transmission rate of the audio signal or a multiplied frequency.

8. The receiver according to claim 5,
wherein any of the plurality of signals is a clock embedded data signal.

9. A transmitting/receiving system comprising:
a transmitter, and
the receiver according to claim 5, the receiver being configured to receive the serial data signal transmitted from the transmitter,
wherein the transmitter transmits to a receiver a serial data signal based on a plurality of signals including at least two types of signal groups having different transmission rates, and comprises:
a latch circuit having a first input terminal that inputs the plurality of signals, a second input terminal that inputs a sampling clock faster than a transmission rate of the fastest signal of the plurality of signals, and an output terminal that outputs a parallel data signal, the latch circuit being configured to keep a level of each of the plurality of signals at a timing indicated by the sampling clock, and then, to output the plurality of signals as the parallel data signal;
an encoder having an input terminal electrically connected to the output terminal of the latch circuit and an output terminal that outputs an encoded parallel data signal, the encoder being configured to generate the encoded parallel data signal based on the parallel data signal from the latch circuit;
a serializer having an input terminal electrically connected to the output terminal of the encoder and an output terminal that outputs the serial data signal, the serializer being configured to generate the serial data signal based on the encoded parallel data signal from the encoder; and
a selector having a first input terminal electrically connected to the output terminal of the serializer, a second input terminal that inputs a training pattern signal for training clock data recovery in the receiver, and an output terminal that outputs a signal to be transmitted to the receiver, the selector being configured to select any of the training pattern signal and the serial data signal from the serializer as the signal to be transmitted to the receiver.

10. A transmitting/receiving system comprising:
a transmitter; and
the receiver according to claim 6, the receiver being configured to receive the serial data signal transmitted from the transmitter,
wherein the transmitter transmits to a receiver a serial data signal based on a plurality of signals including at least two types of signal groups having different transmission rates, and comprises:
a latch circuit having a first input terminal that inputs the plurality of signals, a second input terminal that inputs a sampling clock faster than a transmission rate of the fastest signal of the plurality of signals, and an output terminal that outputs a parallel data signal, the latch circuit being configured to keep a level of each of the plurality of signals at a timing indicated by the sampling clock, and then, to output the plurality of signals as the parallel data signal;
an encoder having an input terminal electrically connected to the output terminal of the latch circuit and an output terminal that outputs an encoded parallel data signal, the encoder being configured to generate the encoded parallel data signal based on the parallel data signal from the latch circuit;
a serializer having an input terminal electrically connected to the output terminal of the encoder and an output terminal that outputs the serial data signal, the serializer being configured to generate the serial data signal based on the encoded parallel data signal from the encoder; and a selector having a first input terminal electrically connected to the output terminal of the serializer, a second input terminal that inputs a training pattern signal for training clock data recovery in the receiver, and an output terminal that outputs a signal to be transmitted to the receiver, the selector being configured to select any of the training pattern signal and the serial data signal from the serializer as the signal to be transmitted to the receiver, wherein the sampling clock is faster than the transmission rate of the fastest signal of the plurality of signals and asynchronous with the fastest signal.

11. A transmitting/receiving system comprising:

a transmitter; and the receiver according to claim 7, the receiver being configured to receive the serial data signal transmitted from the transmitter, wherein the transmitter transmits to a receiver a serial data signal based on a plurality of signals including at least two types of signal groups having different transmission rates, and comprises:

a latch circuit having a first input terminal that inputs the plurality of signals, a second input terminal that inputs a sampling clock faster than a transmission rate of the fastest signal of the plurality of signals, and an output terminal that outputs a parallel data signal, the latch circuit being configured to keep a level of each of the plurality of signals at a timing indicated by the sampling clock, and then, to output the plurality of signals as the parallel data signal;

an encoder having an input terminal electrically connected to the output terminal of the latch circuit and an output terminal that outputs an encoded parallel data signal, the encoder being configured to generate the encoded parallel data signal based on the parallel data signal from the latch circuit;

a serializer having an input terminal electrically connected to the output terminal of the encoder and an output terminal that outputs the serial data signal, the serializer being configured to generate the serial data signal based on the encoded parallel data signal from the encoder; and a selector having a first input terminal electrically connected to the output terminal of the serializer, a second input terminal that inputs a training pattern signal for training clock data recovery in the receiver, and an output terminal that outputs a signal to be transmitted to the receiver, the selector being configured to select any of the training pattern signal and the serial data signal from the serializer as the signal to be transmitted to the receiver, and wherein any of the plurality of signals is an audio signal, and the sampling clock has a frequency equivalent to a transmission rate of the audio signal or a multiplied frequency.

12. A transmitting/receiving system comprising:

a transmitter; and the receiver according to claim 8, the receiver being configured to receive the serial data signal transmitted from the transmitter, wherein the transmitter transmits to a receiver a serial data signal based on a plurality of signals including at least two types of signal groups having different transmission rates, and comprises:

a latch circuit having a first input terminal that inputs the plurality of signals, a second input terminal that inputs a sampling clock faster than a transmission rate of the fastest signal of the plurality of signals, and an output terminal that outputs a parallel data signal, the latch circuit being configured to keep a level of each of the plurality of signals at a timing indicated by the sampling clock, and then, to output the plurality of signals as the parallel data signal;

an encoder having an input terminal electrically connected to the output terminal of the latch circuit and an output terminal that outputs an encoded parallel data signal, the encoder being configured to generate the encoded parallel data signal based on the parallel data signal from the latch circuit;

a serializer having an input terminal electrically connected to the output terminal of the encoder and an output terminal that outputs the serial data signal, the serializer being configured to generate the serial data signal based on the encoded parallel data signal from the encoder; and a selector having a first input terminal electrically connected to the output terminal of the serializer, a second input terminal that inputs a training pattern signal for training clock data recovery in the receiver, and an output terminal that outputs a signal to be transmitted to the receiver, the selector being configured to select any of the training pattern signal and the serial data signal from the serializer as the signal to be transmitted to the receiver, and wherein any of the plurality of signals is a clock embedded data signal.

13. The transmitting/receiving system according to claim 9, wherein, in the transmitter, the sampling clock is faster than the transmission rate of the fastest signal of the plurality of signals and asynchronous with the fastest signal.

14. The transmitting/receiving system according to claim 9, wherein, in the transmitter, any of the plurality of signals is an audio signal, and the sampling clock has a frequency equivalent to a transmission rate of the audio signal or a multiplied frequency.

15. The transmitting/receiving system according to claim 9, wherein, in the transmitter, any of the plurality of signals is a clock embedded data signal.

16. The transmitting/receiving system according to claim 9, wherein, in the receiver, the sampling clock is faster than the transmission rate of the fastest signal of the plurality of signals and asynchronous with the fastest signal.

17. The transmitting/receiving system according to claim 9, wherein, in the receiver, any of the plurality of signals is an audio signal, and the sampling clock has a frequency equivalent to a transmission rate of the audio signal or a multiplied frequency.

18. The transmitting/receiving system according to claim 9, wherein, in the receiver, any of the plurality of signals is a clock embedded data signal.

19. The transmitting/receiving system according to claim 11, further comprising:

a video transmitter configured to transmit a video signal; and a video receiver configured to receive a video signal transmitted from the video transmitter.

\* \* \* \* \*